United States Patent Office 2,735,745
Patented Feb. 21, 1956

2,735,745

OXIDATION OF URANOSIC OXIDE TO URANIUM TRIOXIDE WITH NITRIC ACID VAPOR

Edward R. Flook and Roger G. Sweet, Kenmore, N. Y., assignors to the United States of America as represented by the United States Atomic Energy Commission No Drawing. Application January 29, 1948,
Serial No. 5,196

1 Claim. (Cl. 23—14.5)

This invention relates to a method for the preparation of uranium trioxide ($UO_3$), and more particularly to a method for the preparation of uranium trioxide from uranosic oxide ($U_3O_8$).

An object of this invention is to provide a method whereby a trioxide of uranium is prepared from uranosic oxide ($U_3O_8$).

A further object of this invention is to provide a method whereby uranosic oxide ($U_3O_8$) is converted to uranium trioxide by a process of oxidation.

According to the process of this invention uranosic oxide ($U_3O_8$) is converted to uranium trioxide by oxidation with nitric acid vapor. Conversion of uranosic oxide ($U_3O_8$) to the trioxide by this method is an important step in the production of fluorine-free uranium trioxide from the uranosic oxide produced by processes such as the pyrohydrolysis of uranium hexafluoride and uranyl fluoride. Furthermore, the process of this invention is well-suited for incorporation in processes involving the pyrohydrolysis of uranium hexafluoride and uranyl fluoride to uranosic oxide ($U_3O_8$), since the oxidation of uranosic oxide by the process of this invention can be carried out within the same reaction vessel as that used for the evaporation and hydrolysis of the uranyl fluoride. In this manner dusting and consequent losses of material are avoided.

In accordance with the preferred process of this invention uranosic oxide ($U_3O_8$) is suitably disposed in layers, preferably not more than 3 cm. in thickness, in order to afford greater surface area for reaction with the nitric acid vapors. Under these conditions the uranosic oxide ($U_3O_8$) is completely converted to uranium trioxide by heating in the presence of nitric acid vapor to temperatures between 200–500° C. Although the conversion of uranosic oxide to the trioxide is complete at 500° C., the uranium trioxide ($UO_3$) thus formed is partially degraded to uranosic oxide ($U_3O_8$) unless the material is cooled in the continued presence of nitric acid vapors to temperatures below 400° C. At temperatures between 200–320° C. the product is caked and not very friable, while at temperatures above 400° C. the rate of oxidation is quite slow. It is therefore readily apparent that temperatures between 300–400° C. are the more suitable, while those temperatures in the vicinity of 350° C. are preferred, since oxidation takes place rapidly in this temperature region and a more desirable product is formed thereby.

The product formed by the process of this invention is substantially pure uranium trioxide and contains not more than 0.02% tetravalent uranium as $UO_2$ and less than 0.0015% fluorine. Being soft and friable the product is easily handled during processing, since it does not stick to the reaction vessel and it is easily broken up to powder form merely by agitation.

The uranosic oxide ($U_3O_8$) is oxidized to uranium trioxide by vapors consisting of a mixture of $HNO_3$, NO, $NO_2$, $O_2$, and $H_2O$, such as are obtained by heating a constant boiling mixture of nitric acid. Vapor, derived from the heating of such a constant boiling nitric acid solution (ca. 68.3% $HNO_3$), is passed over the uranosic oxide ($U_3O_8$), which is heated in the manner previously described. While the uranosic oxide ($U_3O_8$) is thus heated, the vapor from the constant boiling nitric acid solution is passed over at a rate sufficient to permit only colorless vapors to come in contact with the reactant mass. When the vapor flow is decreased to the extent that the reaction vessel is filled with fumes having a brown color, the conversion to uranium trioxide is less complete.

The following examples will further illustrate the process of this invention and serve to demonstrate the extent to which the rate of oxidation is affected by such interdependent factors as the rate of vaporization for the nitric acid, the concentration of reactive oxidants in said vapor, the exposed surface area of the reactive mass, and the reaction temperature.

*Example I*

A layer (¾-inch deep) of uranosic oxide ($U_3O_8$), weighing 300 g. was placed in a stainless steel boat within a stainless steel reaction tube heated by a resistance furnace. Vapors from 750 ml. of a constant-boiling nitric acid solution (68.3% $HNO_3$) were passed over the oxide for one hour and five minutes at a temperature of 350–356° C. The conversion to uranium trioxide was complete, the product analyzing for not more than 0.02% $UO_2$.

*Example II*

A ¾-inch layer of uranosic oxide ($U_3O_8$), weighing 300 g., was placed in a platinum-lined evaporating tray which was placed in a platinum-lined reaction tube and treated at 337–349° C. for two and one-fourth hours with the vapor derived from 250 ml. of a constant-boiling nitric acid solution. Conversion to uranium trioxide was substantially complete. The fluorine content of the uranium trioxide thus produced was less than 0.0015% and the percent $UO_2$ in the product was 0.02.

The foregoing examples are the preferred embodiments of this invention and are to be considered as illustrative rather than as a limitation upon the scope of this invention. Only such limitations as those incorporated in the appended claim should be imposed upon the scope of this invention, of which there are numerous modifications which are readily apparent to those skilled in the art.

What is claimed is:

A process for the oxidation of uranosic oxide to uranium trioxide, comprising heating uranosic oxide at a temperature between 400–500° C. in the presence of nitric acid vapor and cooling the reactants to below 400° C. while maintaining nitric acid vapor in the system until the reactants are cooled below 400° C.

References Cited in the file of this patent

Sabatier et al.: Comptes Rendus, vol. 114, page 1431 (1892); vol. 120, pages 618–20 (1895).

Babor et al.: General College Chemistry, 2nd edition, page 390; pub. in 1940 by Thos. Y. Crowell Co., New York.

Mellor: Inorganic and Theoretical Chemistry, vol. 8, page 583; pub. in 1928 by Longmans, Green and Co., London; vol. 12, page 54, pub. in 1932.